UNITED STATES PATENT OFFICE.

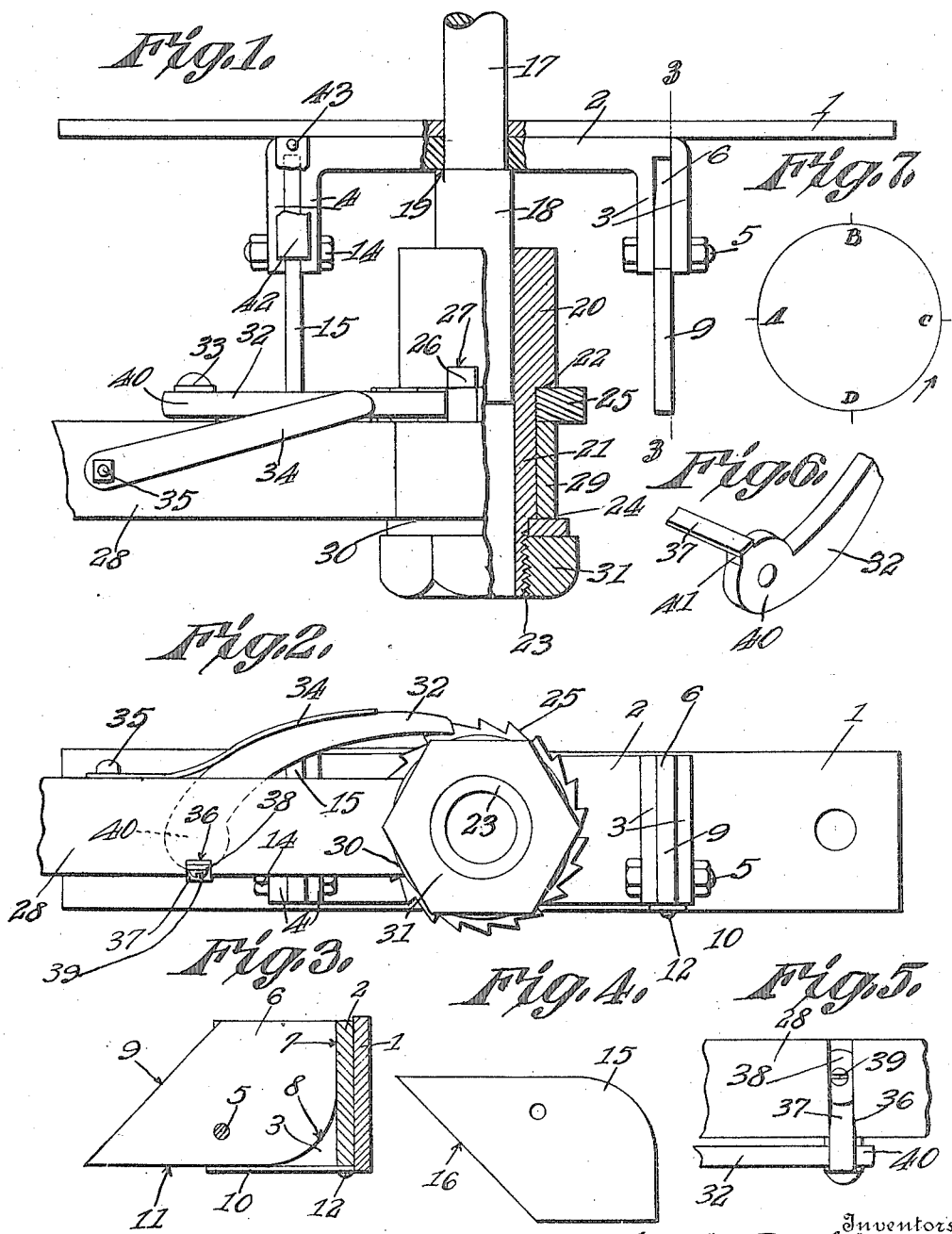

CLARENCE A. BAILEY AND LOUIS C. SOILEAU, OF RAYNE, LOUISIANA.

AUTOMOBILE-CRANK.

1,266,761.  Specification of Letters Patent.  Patented May 21, 1918.

Application filed November 10, 1917. Serial No. 201,343.

*To all whom it may concern:*

Be it known that we, CLARENCE A. BAILEY and LOUIS C. SOILEAU, citizens of the United States, residing at Rayne, in the parish of Acadia, State of Louisiana, have invented a new and useful Automobile-Crank, of which the following is a specification.

The device forming the subject matter of this application is a crank, adapted to be applied to the shaft of an internal combustion engine of the kind used on automobiles, motor boats and the like.

The invention aims to provide novel means whereby, when a back fire occurs, the swinging movement of the handle or crank will be stopped, thereby avoiding an injury to the operator.

It is within the province of the disclosure to improve generally and to enhance the utility of devices of that type to which the present invention appertains.

With the above and other objects in view which will appear as the description proceeds the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—

Figure 1 shows in top plan, a device constructed in accordance with the present invention, parts being shown in section;

Fig. 2 is a front elevation of the device shown in Fig. 1;

Fig. 3 is a section taken on the line 3—3 of Fig. 1, distant parts being omitted;

Fig. 4 is an elevation showing one of the strikers;

Fig. 5 is a fragmental bottom plan of the handle or crank;

Fig. 6 is a fragmental perspective view illustrating a portion of the pawl; and

Fig. 7 is a diagram alluded to in setting forth the operation of the device.

In carrying out the present invention there is provided a support, which may be fashioned variously without departing from the spirit of the invention or jeopardizing the utility of the structure hereinafter described. The support may include a back plate 1 carrying a U-shaped frame made up of a base 2 and forwardly presented ears 3 and 4. A pivot element 5 is mounted in the ears 3. A striker 6, in the form of a plate, is mounted to swing between the ears 3, on the pivot element 5. The striker 6, as shown in Fig. 3, includes a straight rear edge 7, which, coacting with the base 2, between the ears 3, limits the upper swinging movement of the striker on the pivot element 5. One corner of the striker 6 is rounded, as shown at 8, so that the striker can swing downwardly on the pivot element 5. The forward edge of the striker 6 is downwardly and forwardly inclined, as shown at 9. A spring tongue 10 bears against the straight lower edge 11 of the striker 6 and is secured at its rear end, as shown at 12, to the base 2. The tongue 10 serves to maintain the rear edge 7 of the striker yieldably engaged with the base 2.

The ears 4 carry a pivot element 14 on which is mounted to swing, a striker 15, resembling the striker 6 in all essential particulars, aside from the fact that the downwardly and forwardly inclined edge 9 of the striker 6 is replaced, in the striker 15, by an upwardly and rearwardly inclined edge 16, as shown in Fig. 4. A spring tongue 42 bears on the upper edge of the striker 15 and is secured as shown at 43 to the base 2, the tongue 42 having the functions of the tongue 10 of Fig. 3.

An engine shaft 17 is journaled for rotation in the base 2 and in the back plate 1 and is provided with an enlarged end 18 defining a shoulder 19 which coacts with the forward face of the base 2. A collar 20 is secured to the end 18 of the engine shaft and includes a reduced extension 21 defining a shoulder 22 having a reduced tip 23 forming a shoulder 24. A ratchet wheel 25 is mounted on the extension 21 and abuts against the shoulder 22, the ratchet wheel having one or more rearwardly projecting lugs 26, which, being engaged in notches 27 in the forward end of the collar 20, connect the ratchet wheel and the collar 20, for simultaneous rotation, together with the engine shaft 17.

The numeral 28 marks a handle of any desired kind, including an eye 29, mounted to swing on the extension 21 of the collar 20, in front of the ratchet wheel 25. The handle 28 is maintained on the part 21, for swinging movement, by means of a washer 30, abutting against the shoulder 24 and held by a nut 31 threaded on the tip 23. At 32 there appears a pawl, including a head 40 pivoted at 33 to the handle 28, the pawl being constrained by means of a spring 34, to coact with the ratchet wheel 25, the outer end of the spring 34 being secured at 35 to the handle 28. The handle 28 is provided on its lower edge with a cross groove 36 in which is mounted a spring latch 37, retained by a washer 38 and a securing element 39, the latter engaging the handle. The spring latch 37 extends across the edge of the head 40 of the pawl 32, the head of the pawl having a transverse shoulder 41, the structure above described being best understood when Figs. 5 and 6 are examined.

In practical operation, the handle 28 is swung to and fro, and the pawl 32, coacting with the ratchet wheel 25, imparts rotation to the shaft 17. During this operation, and while the pawl 32 is clicking over the teeth of the ratchet wheel 25, the spring latch 37 on the handle 28 rides on the periphery of the head 40, as shown in Fig. 6, but does not engage with the shoulder 41. The handle 28 may be moved through an arc of any desired extent, to crank up the engine, and when this operation occurs, the pawl 32 engages with the inclined edge 9 of the striker 6 and tilts the striker 6 on its fulcrum 5, the pawl engaging, in a similar way, with the inclined edge 16 of the striker 15 and effecting a tilting of the said striker.

Let it be supposed, however, that, while the handle 28 is moving through the arc C—D—A of Fig. 7, a back fire occurs. Then the handle 28 is forcibly swung in the direction of the arrow in Fig. 7. The pawl 32 is engaged by the forward end of the striker 6, and the striker 6 remains rigid, because the edge 7 of the striker abuts against the base 2. The striker 6 will bear upon and disengage the pawl 32 from the ratchet wheel 25, and the handle 28 will be forcibly rotated no farther as a result of the back fire. When the pawl 32 is swung on its pivot 33, by the action of the striker 6, as aforesaid, the latch 37 snaps down in front of the shoulder 41 on the head 40 of the pawl and prevents the pawl from dropping back into engagement with the ratchet wheel 25, due to the action of the spring 34. If the handle 28 happens to be swinging through the arc A—B—C, at the time the back fire occurs, then the handle will be swung forcibly, due to the back fire, in the direction of the arrow in Fig. 7, until the pawl 32 is caught by the striker 15, which cannot swing downwardly, the pawl 32 being disengaged from the ratchet wheel 25, and the spring latch 37 being engaged in front of the shoulder 41, as hereinbefore described in connection with the operation of the striker 6.

Having thus described the invention, what is claimed is:—

1. In a device of the class described, a support; an engine shaft journaled thereon; a ratchet wheel carried by the shaft; a handle journaled on the shaft; a pawl mounted on the handle and coacting with the ratchet wheel; a striker extended into the path of the pawl and constituting means for detaching the pawl from the ratchet wheel in case of a back-fire; means for mounting the striker for swinging movement; and means for limiting the swinging movement of the striker in one direction.

2. A device constructed in accordance with claim 1, in combination with automatically acting means for holding the pawl out of engagement with the ratchet wheel, after the pawl has been disengaged from the wheel by the striker.

3. In a device of the class described, a support; an engine shaft journaled thereon; a ratchet wheel carried by the shaft; a handle journaled on the shaft; a pawl mounted on the handle and coacting with the ratchet wheel; a striker extended into the path of the pawl and constituting means for detaching the pawl from the ratchet wheel in case of a back-fire; means for mounting the striker movably; and means for limiting the movement of the striker in one direction.

4. A device constructed in accordance with claim 3, in combination with automatically acting means for holding the pawl out of engagement with the ratchet wheel, after the pawl has been disengaged from the wheel by the striker.

In testimony that we claim the foregoing as our own, we have hereto affixed our signatures in the presence of two witnesses.

CLARENCE A. BAILEY.
LOUIS C. SOILEAU.

Witnesses:
A. C. CHAPPUIS,
R. H. BULL.